United States Patent [19]

Olson et al.

[11] Patent Number: 4,534,793
[45] Date of Patent: Aug. 13, 1985

[54] CAST IRON WELDING MATERIALS AND METHOD

[75] Inventors: David L. Olson, Golden, Colo.; Alfredo D. Marquez, Caracas, Venezuela

[73] Assignee: Research Corporation, New York, N.Y.

[21] Appl. No.: 442,172

[22] Filed: Nov. 16, 1982

Related U.S. Application Data

[63] Continuation of Ser. No. 77,038, Sep. 19, 1979, abandoned.

[51] Int. Cl.³ .............................................. B23K 35/22
[52] U.S. Cl. .................... 75/123 N; 148/24; 148/26; 219/137 WM; 219/146.23
[58] Field of Search .................. 75/123 K, 123 N; 219/137 WM, 146.1, 146.23; 148/26, 24; 428/679, 682, 683; 228/263 C, 263 D

[56] References Cited

U.S. PATENT DOCUMENTS

| | | | |
|---|---|---|---|
| 1,561,306 | 11/1925 | Brach . | |
| 1,815,464 | 7/1931 | Fahrenwald | 219/137 |
| 2,111,278 | 3/1938 | Charlton | 75/125 |
| 2,156,306 | 5/1939 | Rapatz | 75/123 N |
| 2,184,518 | 12/1939 | Eash et al. . | |
| 2,266,762 | 12/1941 | Jerabek | 75/123 K |
| 2,313,420 | 3/1943 | Cape | 75/128 |
| 2,355,271 | 8/1944 | Cape | 75/128 |
| 2,457,215 | 12/1948 | Eash | 219/8 |
| 2,662,011 | 12/1953 | Gagnebin et al. . | |
| 2,706,696 | 4/1955 | Payson | 148/31 |
| 2,709,132 | 5/1955 | Giles | 75/128 |
| 2,802,756 | 8/1957 | Bloom | 117/207 |
| 2,815,280 | 12/1957 | Clarke, Jr. | 75/128 |
| 2,875,104 | 2/1959 | Bergh et al. | 75/122 |
| 3,231,709 | 1/1966 | Foley, Jr. | 219/76 |
| 3,250,612 | 5/1966 | Roy | 75/126 |
| 3,266,876 | 8/1966 | DeLong | 75/123 K |
| 3,334,996 | 8/1967 | Foster | 75/126 |
| 3,556,777 | 1/1971 | Petry | 75/126 |
| 3,660,080 | 5/1972 | Espy | 75/128 A |
| 3,663,214 | 5/1972 | Moore et al. | 75/126 |
| 3,740,212 | 6/1973 | Church | 75/128 |
| 3,851,142 | 11/1974 | Bishel | 219/137 |
| 3,859,083 | 1/1975 | Kusaka et al. | 75/128 A |
| 3,901,690 | 8/1975 | Philip et al. | 75/123 |
| 3,986,867 | 10/1976 | Masumoto et al. | 75/126 |
| 4,043,843 | 8/1977 | Tanczyn | 75/126 A |
| 4,087,673 | 5/1978 | Kiilunen | 219/137 |
| 4,122,817 | 10/1978 | Matlock | 75/128 D |

OTHER PUBLICATIONS

Semi-Annual Investigation of the MnO-SiO₂-Oxides and MnO-SiO₂-Fluorides Welding Flux Systems, David L. Olson, Jun. 30, 1978, U.S. Army Research Office DAAG29-77-G-0097, Colorado School of Mines, approved for public release; distribution unlimited.

Primary Examiner—Melvyn J. Andrews
Attorney, Agent, or Firm—Scully, Scott, Murphy & Presser

[57] ABSTRACT

Filler compositions based on manganese and manganese-nickel for the welding of cast iron are disclosed. The filler compositions contain about 15 to 50% manganese and 10 to 35% nickel. The filler compositions may be incorporated into a welding rod or a flux.

16 Claims, 9 Drawing Figures

CAST IRON WELDING MATERIALS AND METHOD

BACKGROUND OF THE INVENTION

The invention described herein was made in the course of a grant or award from the U.S. Army Research Office, an agency of the U.S. Government.

This is a continuation of application Ser. No. 077,038, filed Sept. 19, 1979, now abandoned.

This invention relates to filler compositions used for welding cast irons.

The cast irons are a family of iron alloys containing 1.8 to 4.5% carbon. The family includes gray iron (ca. 3.4%C), malleable iron (ca. 2.5% C), and ductile iron (ca. 3.4% C). The cast irons, especially ductile iron, possess many of the physical properties of steel, such as strength and toughness. These irons are increasingly being used to replace steel castings since they are cheaper and require less energy to produce. In order to realize their full potential, however, it is necessary to develop new and acceptable methods of welding cast iron parts.

Many prior patents disclose welding compositions useful for welding iron or steel. For example, U.S. Pat. No. 3,266,876 discloses a ferrous weld deposit containing 0.4 to 1% carbon, 9.5 to 31% manganese, and 2.5 and 35% nickel. The patent discloses that this composition retains useful properties at temperatures of −320° F. However, this patent does not deal with the special problems encountered in welding cast irons.

Because of their high carbon content, two major problems arise in the fusion welding of cast irons: (a) the formation of massive carbides in regions of the parent metal that are melted or partially melted during the weld pass, and (b) the formation of martensite in regions of the parent metal that are heated to a temperature above the eutectoid but below the eutectic. Both carbide and martensite formation result in weld zones having properties different from those of the base metal. Thus, the weld zone may be lower in strength, lower in ductility, and most significantly, more brittle than the surrounding metal.

Two approaches to the fusion welding of cast irons have been used to achieve sound welds. In the first approach, nodular graphite is produced in the weld which resembles the graphite contained in the base metal. This is accomplished by adding graphitizing agents, such as silicon, and nodularizing agents, such as magnesium or rare earth metals, to the weld metal from the welding rod or flux. In this way, a weld metal is produced which has a microstructure, mechanical properties, and thermal expansion properties similar to those of the base metal.

In the second approach, nickel or copper is added as filler materials to the weld pool to produce an austenitic weld metal. The austenitic weld metal is tough, relatively soft, and exhibits other favorable properties. Satisfactory welds are produced by this approach because the eutectoid transformation to martensite is avoided and because of the ability of austenite to absorb carbon rejected by the melted cast iron, thus reducing the formation of carbides.

Nickel works successfully in this second approach because it is an austenite phase stabilizer. When present in austenite, it shifts the eutectoid point so as to suppress the transformation of austenite into pearlite. Nickel is therefore classified as an austenite former.

At present, nickel is typically introduced into the weld pool as an ingredient of the welding rods. Nickel-base covered electrodes are available for the arc welding of cast irons. These electrodes are classified as "pure" nickel, containing 90 to 95% Ni, nickel-iron, containing about 55% Ni, and nickel-copper, containing about 60% Ni.

The "pure" nickel and nickel-iron electrodes have emerged as the most satisfactory thus far for welding cast iron.

The use of nickel as filler material for welding cast iron presents several problems. First, nickel is expensive. Second, the thermal properties of nickel are significantly different from those of cast iron and give rise to thermal expansion mismatch between base metal and weld metal. This can result in stresses high enough to cause cracking. Third, phosphorus has low solubility in nickel. This too can result in cracking when nickel-base electrodes are used in weld irons high in phosphorus.

Accordingly, it is an object of the present invention to produce a filler material with substantially reduced nickel content for welding cast iron.

It is also an object of the present invention to reduce the mismatch between the thermal properties of the fusion zone and the base metal.

It is also an object of the present invention to produce a fusion zone of acceptable strength and toughness.

SUMMARY OF THE INVENTION

These and other objects are achieved by replacing nickel in the filler material with manganese. More specifically, it has been found that filler materials containing 15 to 50% manganese and 10 to 35% nickel provide acceptable cast iron weldments. A filler material containing 20% manganese and 20% nickel has been found to provide optimal results.

DETAILED DESCRIPTION OF THE INVENTION

Manganese like nickel, acts as an austenite phase stabilizer and promotes formation of austenitic phase fusion zones. These zones absorb large amounts of carbon and other interstitial elements from melted cast iron. Carbide formation, and the brittleness associated with it, are thereby suppressed.

Among the advantages of replacing nickel with manganese are the following:

(a) Filler materials based on manganese-nickel alloys have a lower melting temperature than nickel-based alloys. Thus, less heat is required during welding. This results in savings and also decreases the cracking susceptibility in the partially melted region of the heat affected zone.

(b) Substantial manganese additions reduce the hardness of the fusion zone and achieve better mechanical properties than found with high nickel filler materials.

(c) Manganese-nickel filler materials achieve excellent thermal expansion compatibility with the base metal and better machinability than high nickel filler materials.

(d) Manganese is cheaper than nickel

It has been demonstrated that 55% manganese metal powder additions to a neutral commercial submerged arc weld flux can produce lower fusion zone hardness in ductile iron weldments than found with iron-55% nickel filler metal wire. Filler compositions containing 10 to 35% nickel and 15 to 50% manganese provide even further improvements in cast iron weldment properties. For example, a mixture of 50% manganese and 10% nickel achieved the lowest weld hardness. It has also been shown that mixtures of manganese and nickel are better than either manganese or nickel alone for austenite stabilization. A filler composition containing 20% manganese and 20% nickel was found to be optimal for reducing the propensity to crack, increasing machinability, and achieving the greatest economy. The filler compositions of the present invention maybe used to weld cast iron to base metals made of either cast iron or other materials, such as steel, stainless steel, high nickel alloys.

All methods and processes which may be used to introduce filler materials to the weld pool are considered part of the present invention. The filler materials of the present invention may be added as part of the flux. Alternatively, the filler materials may be incorporated into a welding rod or wire. The filler materials may be coated onto or be contained within such welding rods and wires. The filler materials may be introduced into the weld pool through a combination of welding rod and flux additions.

The filler compositions of the present invention are useful for all methods of fusion welding cast iron. For example, the compositions may be used advantageously in the practice of submerged arc welding or gas metal arc welding. The compositions may also be used advantageously in the practice of gas welding, such as oxyacetylene welding.

EXPERIMENTAL RESULTS

A series of tests were conducted to demonstrate the usefulness of the filler compositions within the scope of the present invention. These tests should not be construed as limiting the scope of the invention.

Plates made of ductile iron containing 3.80% carbon were prepared for testing. Fifty 1000 gm flux samples were then prepared by mixing various amounts of 99.9% pure Mn and Ni powder (100 mesh average) with Hobart H-700 SAW flux. The filler metal case from a Page Corporation type E1-12 ⅛ diameter low carbon steel welding wire.

Weld deposits were produced using the submerged arc weld process. The welding parameters used in this investigation were selected to produce a constant heat input of 88 kilojoules/inch. The welding voltage was 30 volts with a travel speed of 9.6 inches per minute, and the current was approximately 500 amperes. Using these parameters and the fluxes already described, single-pass bead-on-plate specimens were made on the pearlitic ductile iron base metal plate which had been ground prior to welding to remove any oxide scale. The weldments were made in the flat position using direct current reverse polarity. The specimens were allowed to cool to room temperature before the flux cover was removed. To investigate the temperature profiles produced by welding with some of these fluxes, ten thermocouples were placed at intervals across certain specimens.

1. EFFECTS OF MANGANESE AND NICKEL ON THE FUSION ZONE

Fifty weld specimens were prepared and microscopically examined to observe the effects of nickel and manganese additions to the welding fluxes on the microstructure and properties of the fusion zone.

Figure 1:
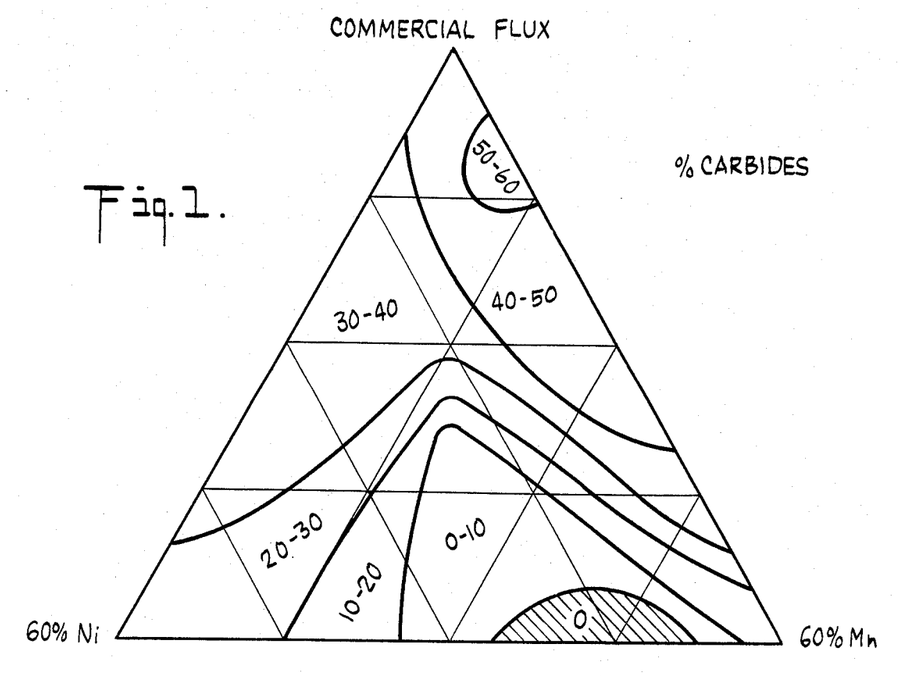
FIG. 1 illustrates the volume percent of carbides in the weld metal as a function of the manganese and nickel content in the flux.

FIG. 1 shows the volume percent of carbides in the fusion zone as a function of flux composition. With no manganese or nickel additions to the flux, the structure is carbides and very fine pearlite, as compared to the pearlite of the ductile iron base metal. The maximum amount of carbides in the fusion zone resulted with a 10% Mn addition to the flux. Small amounts of nickel in the flux are more effective than small amounts of manganese in reducing the amount of carbides, but for large additions this trend is reversed, as indicated by the close spacing of the lines on the lower part of the manganese side of this diagram. The smallest amount of carbides are found in welds made with fluxes containing both manganese and nickel.

The reduction in amount of carbides causes a decrease in carbide continuity, and eventually carbide-free zones are produced in the flux composition range which is illustrated as cross-hatched in FIG. 1. Fluxes which produced fusion zones with discontinuous carbides occupy a larger range, lying roughly within the 0–10% carbide region.

Furthermore, micrographs of the samples suggest that the manganese additions are not only more effective than nickel in reducing amounts of carbides, but are also more effective in making the carbides discontinuous when comparable amounts of carbide are present. The most important practical aspect of carbide content and morphology is the strong effect on machinability. Machinability was simulated by drilling tests which were done on various fusion zone samples. These tests showed that, qualitatively, drilling was faster and easier as carbide content and continuity decreased.

Figure 2:
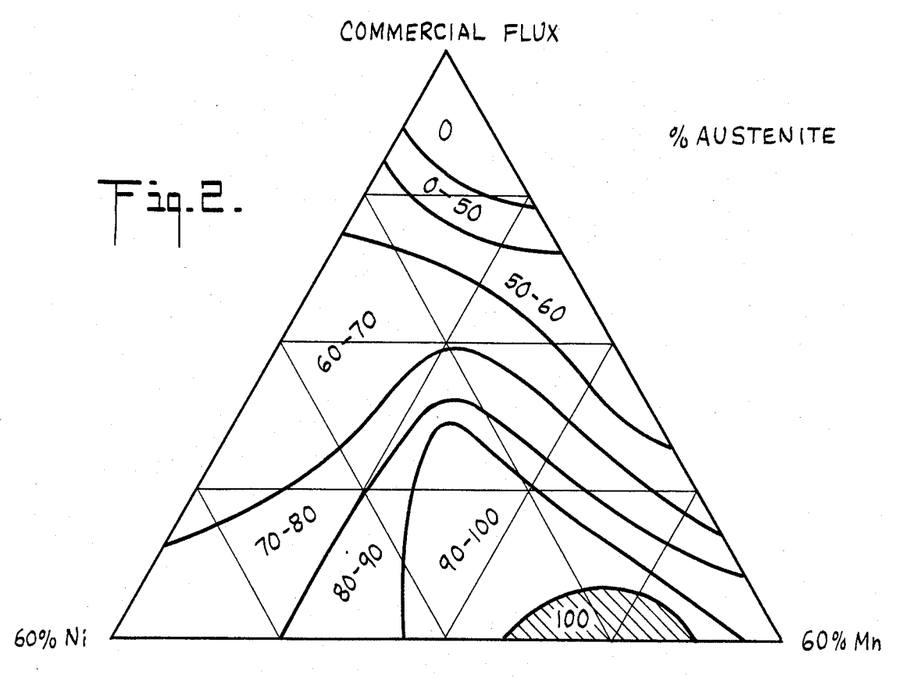
FIG. 2 illustrates the volume percent of austenite in the weld metal as a function of the manganese and nickel content in the flux.

FIG. 2, which relates the amount of retained austenite in the weld metal to flux composition, shows some similarities to FIG. 1. The amount of retained austenite increases with the alloy content of the flux. Also, fusion zones produced with high alloy fluxes contain either austenite or carbide, so the lower section of the diagram illustrates that a decrease of carbides is accompanied by an equal increase in austenite. Therefore, the carbide-free zone in FIG. 1 is matched by a 100% austenite area in FIG. 2. However, this is not true in the low alloy regions where the microstructures contain significant amounts of other microconstituents, such as pearlite and matensite.

Figure 3:
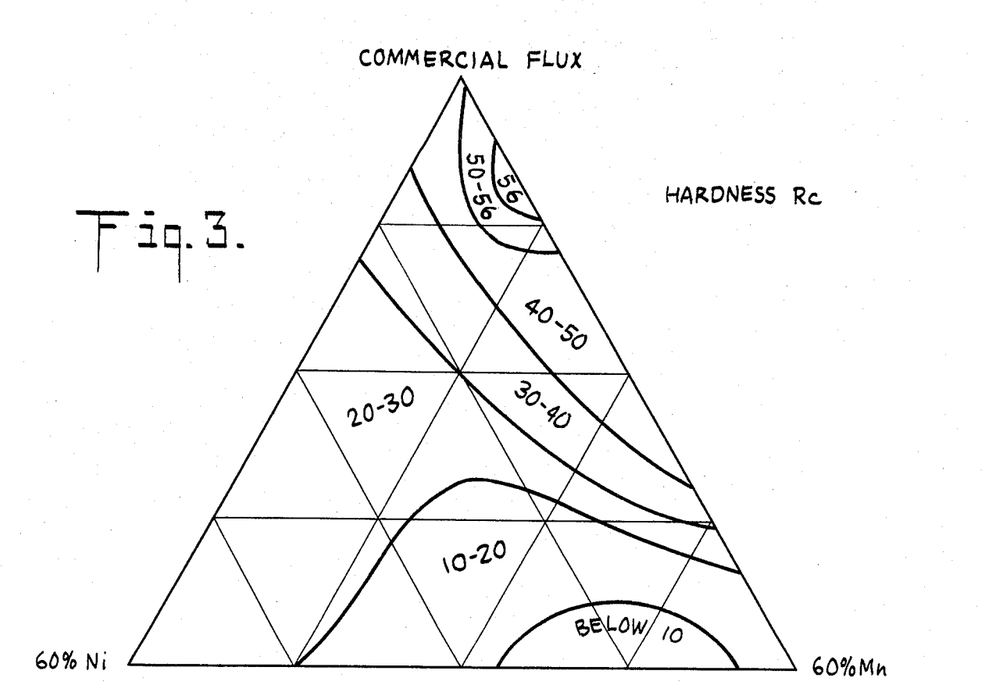
FIG. 3 illustrates the weld metal hardness as a function of the manganese and nickel content in the flux.

Again, the relative effectiveness of manganese and nickel changes as total alloy content increases. Nickel is the more effective austenite stabilizer in low amounts, since at least 10% Ni in the fusion zone is needed to produce stable austenite; but FIG. 3 shows that manganese is more effective in large additions. The two figures also show that combinations of manganese and nickel are better than either manganese or nickel alone for austenite stabilization.

Fluxes containing small amounts of manganese produced more martensite than those with no alloy additions. This is probably due to the increase in hardenability provided by small amounts of manganese. In some low-alloy welds, hard nodules were found.

The graphitizing effect of nickel was evident from the micrographs which showed that graphite formed in the spaces between dendrites in a type D flake morphology. Residual amounts of nodularizing agents caused some spheres of graphite to form with the flakes. Type D graphite is damaging to mechanical integrity, and, all other things being equal, it would be better to produce no graphite by using Mn than to produce deleterious graphite with nickel. However, the graphite does help to reduce thermal expansion.

Since hardness is strongly influenced by microstructure, FIG. 3 is very similar to FIG. 2 and even more so to FIG. 1. The isolated regions of high hardness are caused by the tendency toward increased hardenability and carbide formation when small amounts of manganese are used. Conversely, the region of very low hardness at the bottom of FIG. 3 is caused by the lack of carbides in the samples. Between these two extremes, the fusion zone hardness decreases as the amount of carbide is reduced by increasing alloy additions. The higher hardness values of samples in which nickel is the main alloy element may be caused in part by the greater continuity of the carbide networks in these samples, as discussed above.

2. EFFECTS OF MANGANESE AND NICKEL ON THE HEAT AFFECTED ZONE

One problem which is common to both filler metal approaches is that as the base metal is heated above the eutectoid temperature, the dissolution of the graphite spheroids increases the carbon content of the surrounding matrix in the heat-affected zone. Upon cooling, this carbon-enriched matrix may transform to produce carbides and martensite. This concern over continuous carbide formation in the heat affected zone (HAZ) suggests using welding procedures with low heat input.

Figure 4:
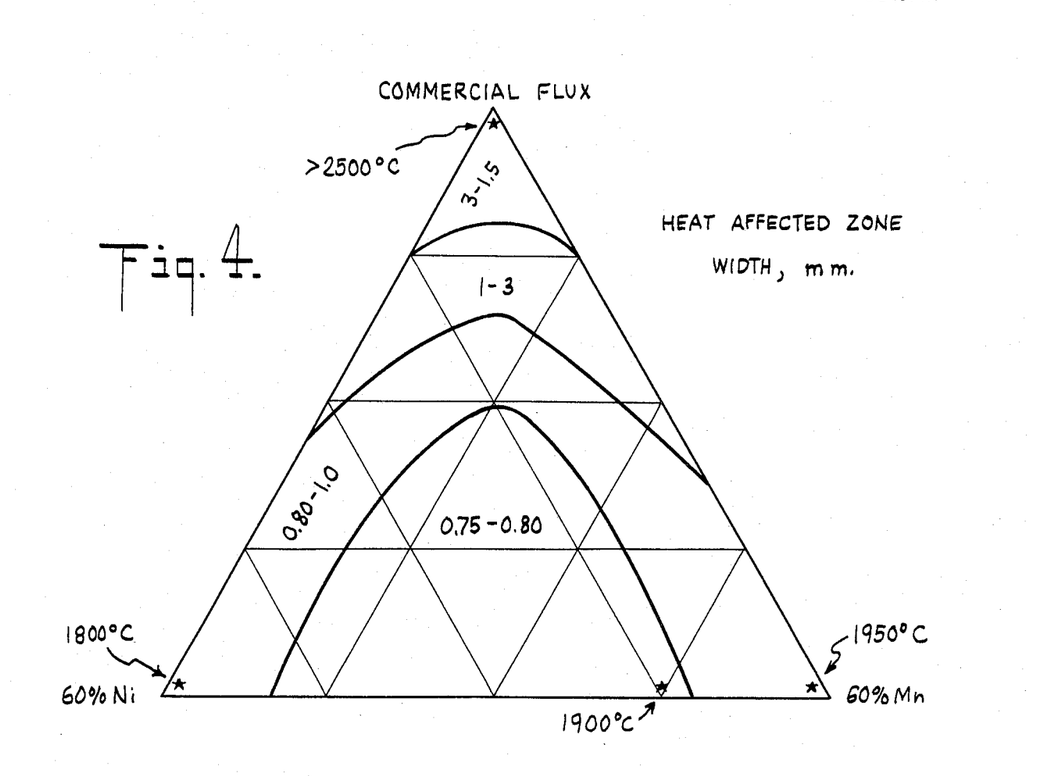
FIG. 4 illustrates the width of the heat affected zone and the temperature of the weld pool as a function of the manganese and nickel content in the flux.

The heat affected zone varied significantly with flux composition, as shown in FIG. 4. Also shown in this figure are the best estimates of the temperatures of the weld pools produced by these fluxes. As indicated, the HAZ widths show no completely consistent correlation with the pool temperatures.

Figure 5:
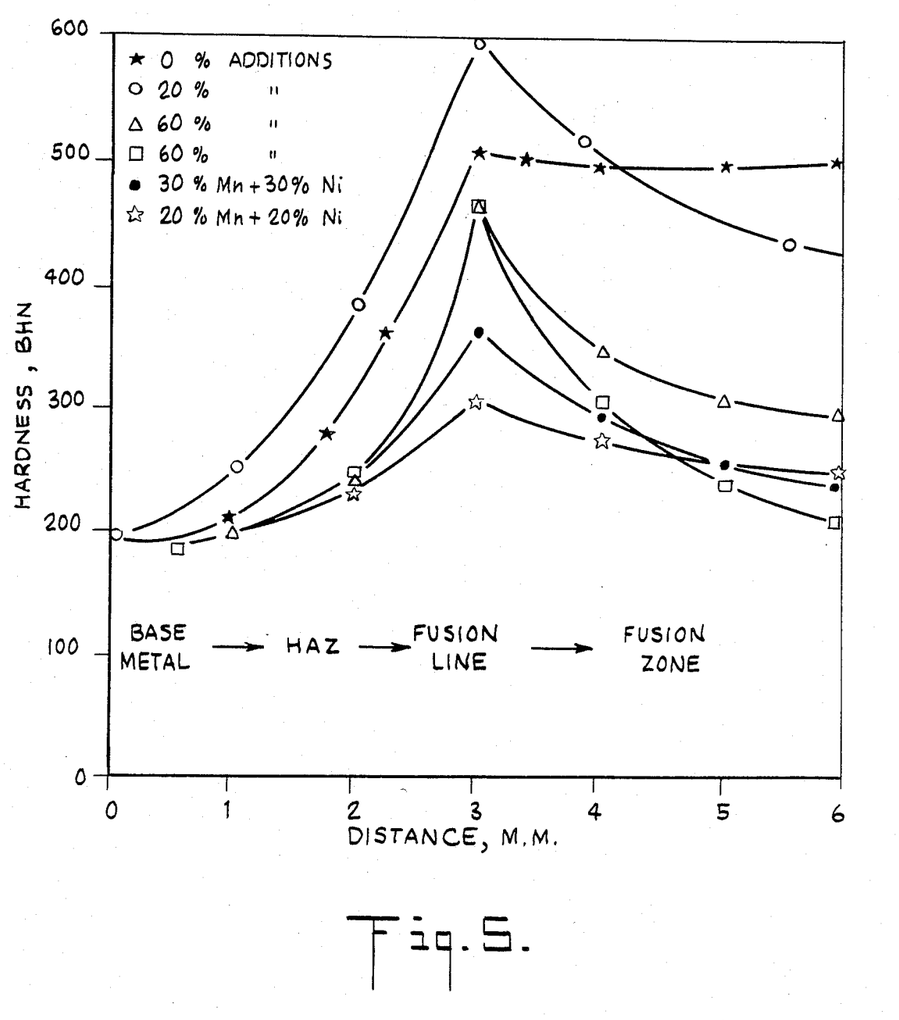
FIG. 5 graphically illustrates the hardness profile of the weldments as a function of the manganese and nickel content in the flux.

The hardness profiles in FIG. 5 show large variations in peak fusion line hardness as the flux compositions change. These variations may be influenced by the maximum fusion zone temperature, but the hardenability and austenite stabilizing effects of the alloy additions were probably more significant in causing the variations. Flux composition also had a strong influence on fusion zone hardness as discussed earlier.

By comparing FIG. 5 with micrographs, it is seen that the changes in peak hardness reflect vastly different fusion line and HAZ microstructures for different filler compositions. Fusion lines resulting from 30% Mn–30% Ni and 20% Mn–20%Ni fluxes are narrow and relatively soft. The lack of carbides in these fusion lines suggests that the fusion zone solidified below the base metal eutectic temperature; conversely, the large amount of carbides in the fusion zone made without flux additions is evidence of a fusion zone which solidified at a temperature much higher than that of the base metal eutectic. The hardest HAZ, made with 20% Mn flux, had this same type of microstructure. Heat affected zones intermediate in carbide content and carbide continuity result when the fusion zone melting point is slightly above the base metal eutectic.

Sequential micrographs demonstrate many of the fusion line and heat affected zone concepts discussed previously. Away from the fusion zone, the maximum local base metal temperature is not high enough to effect any phase transformations and the base metal is virtually unchanged.

Moving toward the fusion zone, and thus toward higher maximum temperatures, the unaffected base metal gives way to the HAZ. In this region, temperatures between the eutectoid and eutectic range are reached. Diffusion of carbon from the graphite nodules into the surrounding austenite and the subsequent austenite transformation upon cooling give rise to a variety of microstructures in the HAZ. In low-temperature regions, carbon diffuses away from the nodules during heating and back toward the nodules during cooling. This leaves a band of high-carbon austenite which transforms to make a ring of pearlite colonies within the ferrite ring. Higher temperature regions contain martensite because the more extensive diffusion of carbon produced a higher-carbon austenite, and because the higher cooling rates in these regions suppressed the pearlite reaction.

Where temperatures are high enough to be in the liquid plus austenite ranges, incipient melting occurs. The nodules partially decompose in the eutectic reaction to produce a shell of high-carbon liquid. This liquid transforms to austenite plus carbide because of the high cooling rates. Bordering on the fusion zone, the carbide shells connect to each other or open into the fusion zone to form fusion lines of various morphologies. Finally, the fusion zone is reached, and consists of austenite and carbides in amounts determined by the fusion zone composition.

3. EFFECTS OF MANGANESE AND NICKEL ON THE COEFFICIENT OF THERMAL EXPANSION

Figure 6:
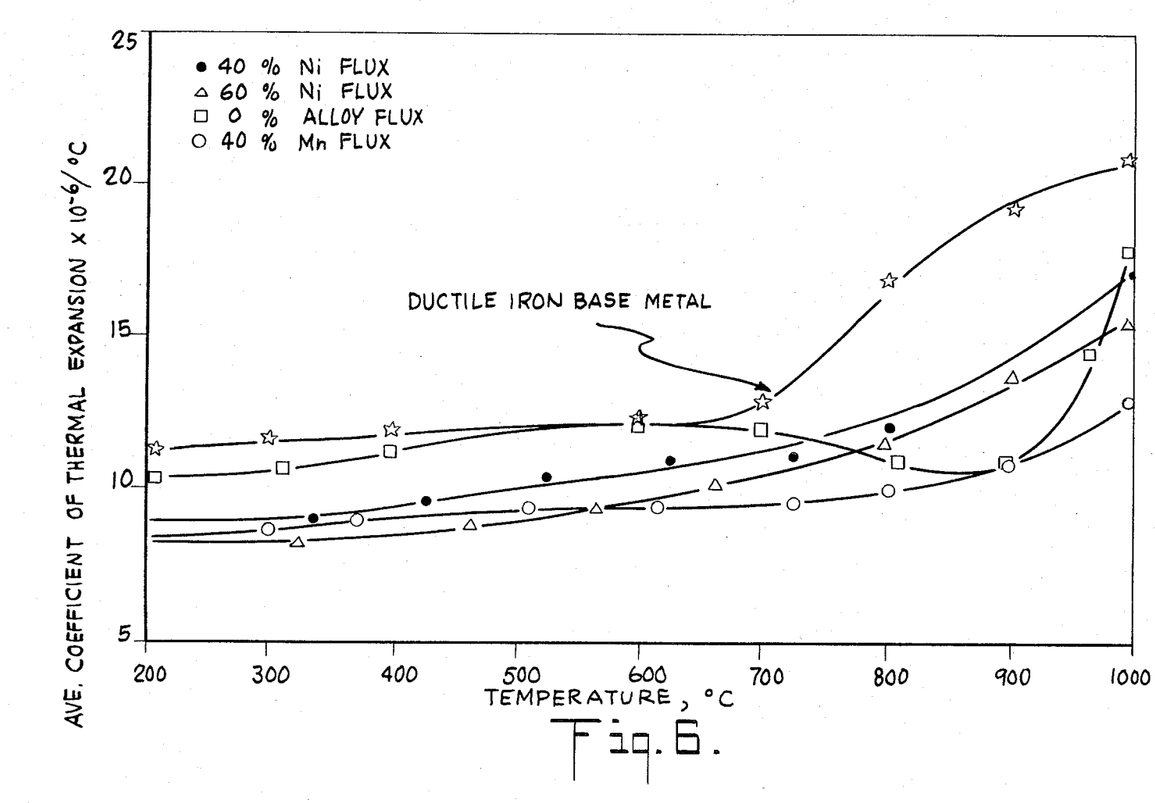
FIG. 6 graphically illustrates the average coefficient of thermal expansion as a function of the temperature of weld metal made with manganese-nickel filler compositions.
Figure 7:
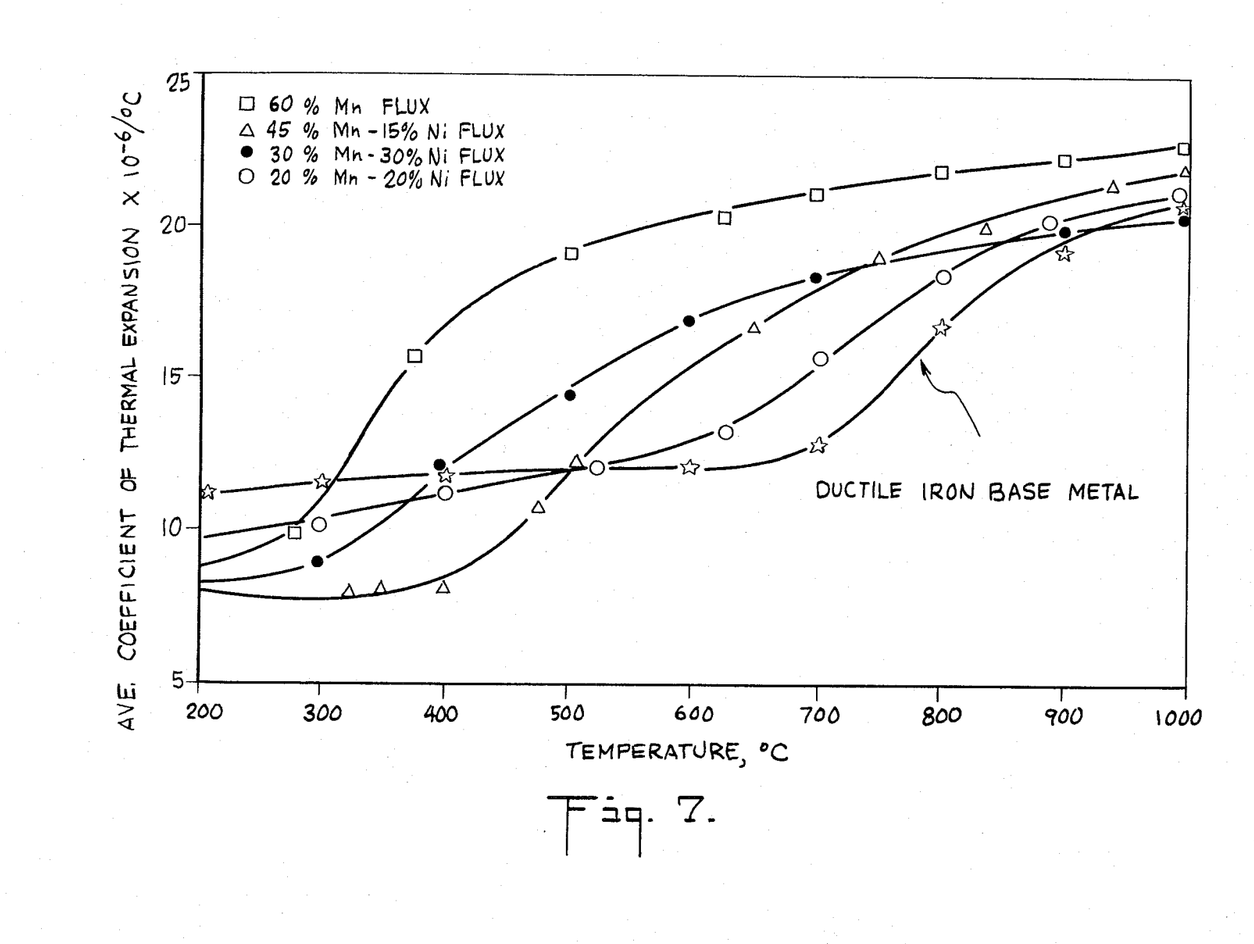
FIG. 7 also graphically illustrates the average coefficient of thermal expansion as a function of the temperature of weld metal made with manganese-nickel filler compositions.

The average coefficient of thermal expansion was measured as a function of temperature for selected samples, and the results are plotted in FIGS. 6 and 7. The curves for base metal and welds with no flux additions show changes in slope due to the pearlite to austenite transformation. As shown, the 60% Ni flux produces welds with lower coefficients of thermal expansions than that of the base metal, while welds made with the 60% Mn flux have larger coefficients of thermal expansion ($\alpha$). Large amounts of carbides in the weld, as in the 40% Mn sample, reduce the coefficient of thermal expansion.

Figure 8:
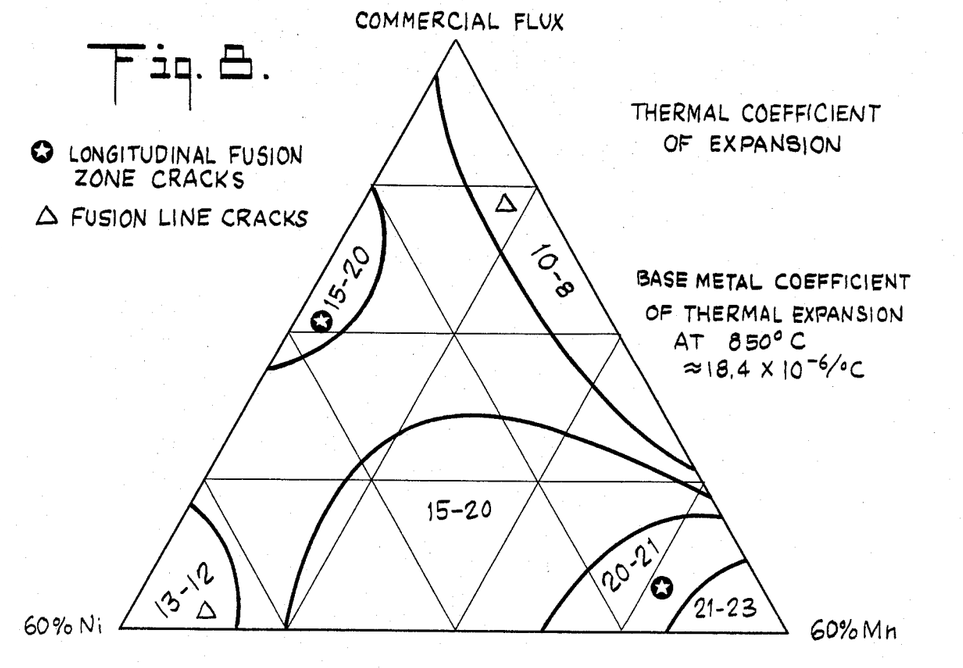
FIG. 8 illustrates the average coefficient of thermal expansion of weld metal at 850° C. as a function of the manganese and nickel content in the flux.

The effects of flux composition on thermal expansion are presented in a more general way in FIG. 8 which shows the value of $\alpha$ at 850° C. Also shown, are symbols which indicate the types of cracking found in each zone of $\alpha$ values. As a rule, the welds with high value of $\alpha$ showed longitudinal fusion zone cracks because of residual tensile stresses in the bead. On the other hand, welds with very low values of thermal expansion tend to develop compressive stresses on the bead, which can result in fusion line cracks at the very bottom of the fusion zone.

By showing the general trends in $\alpha$, FIG. 8 suggests ways of optimizing the flux composition. To reduce cracking tendencies, the coefficient of expansion of the fusion zone should match that of the base metal ($18.4 \times 10^{-6}$/°C. at 850° C.). By reducing the nickel content of fluxes containing only nickel, $\alpha$ increases towards the value for the base metal. At the same time, however, excessive amounts of carbide cause hardness and machinability problems. Similarly, reducing the manganese content of fluxes with only manganese will cause $\alpha$ to decrease towards the value for the base metal, but excessive carbides would again cause problems. Suitable values of $\alpha$ and acceptable hardness can be produced with certain fluxes along the 60% total alloy line. Satisfactory results may also be obtained using smaller alloy additions when the flux composition is near the 20% Mn-20% Ni point

4. CHEMICAL ANALYSIS OF THE FUSION ZONE

Several samples were chemically analyzed to determine fusion zone composition. From this, the recovery of the alloy elements from the flux was calculated. It was found that the recovery of nickel was higher than that of manganese. On the average, the recovery of manganese was 64% and the recovery of nickel was 83%. The chemical analysis and recovery in each sample are presented in Table I.

TABLE I

| Flux Composition | % Mn in Fusion Zone | % Ni in Fusion Zone | % C in Fusion Zone | % Mn Recovered | % Ni Recovered |
| --- | --- | --- | --- | --- | --- |
| 0% Mn—0% Ni | 1.22 | 0.05 | 2.06 | — | — |
| 0% Mn—20% Ni | — | 12.6 | 2.83 | — | 63 |
| 0% Mn—40% Ni | — | 23.3 | 1.90 | — | 58 |
| 0% Mn—60% Ni | — | 39.4 | 1.80 | — | 66 |
| 10% Mn—10% Ni | 6.2 | 9.6 | 1.80 | 62 | 96 |
| 20% Mn—20% Ni | 13.1 | 15.9 | 1.12 | 66 | 80 |
| 30% Mn—30% Ni | 20.2 | 34.3 | 1.21 | 67 | 114 |
| 20% Mn—0% Ni | 13.4 | — | 2.10 | 67 | — |
| 40% Mn—0% Ni | 18.0 | — | 2.15 | 45 | — |
| 60% Mn—0% Ni | 50.9 | — | 0.26 | 85 | — |
| 15% Mn—45% Ni | 3.6 | 21.4 | 1.56 | 24 | 48 |
| 45% Mn—15% Ni | 43.1 | 20.7 | 0.12 | 96 | 138 |

It will be observed that carbon is absorbed into the fusion zone from the base metal. In almost all cases, the fusion zone contained more than 1% carbon.

Knowing the fusion zone composition allows determination of the composition of welding rods and wires which would give the same results as the alloyed fluxes. It should be mentioned that the low recovery of manganese and nickel in some cases, present no real practical problems, since this type of recovery is not encountered in other wire processes which are more suitable than the submerged arc welding process for most production welding of cast iron.

5. OPTIMIZING THE WELD METAL COMPOSITION

The determination of an optimum fusion zone composition was based on considerations of reducing cracking propensity, increasing machinability, and achieving economy. Fusion line cracking is aggravated by the presence of continuous carbides and the hard fusion lines which they create. Fusion zone cracking can be used by excessive amounts of continuous carbide and by thermal expansion mismatch, which also can initiate fusion line cracks. Cracking problems, then, can best be avoided by producing welds with carbide-free fusion lines, soft fusion zones with discontinuous carbides, and coefficients of thermal expansion which match that of the base metal. Machinability also is increased when the fusion lines are soft and when the fusion zone has small amounts of discontinuous carbides in a soft austenite matrix. The best economy is achieved by reducing total alloy content and by substituting manganese for nickel.

Figure 9:
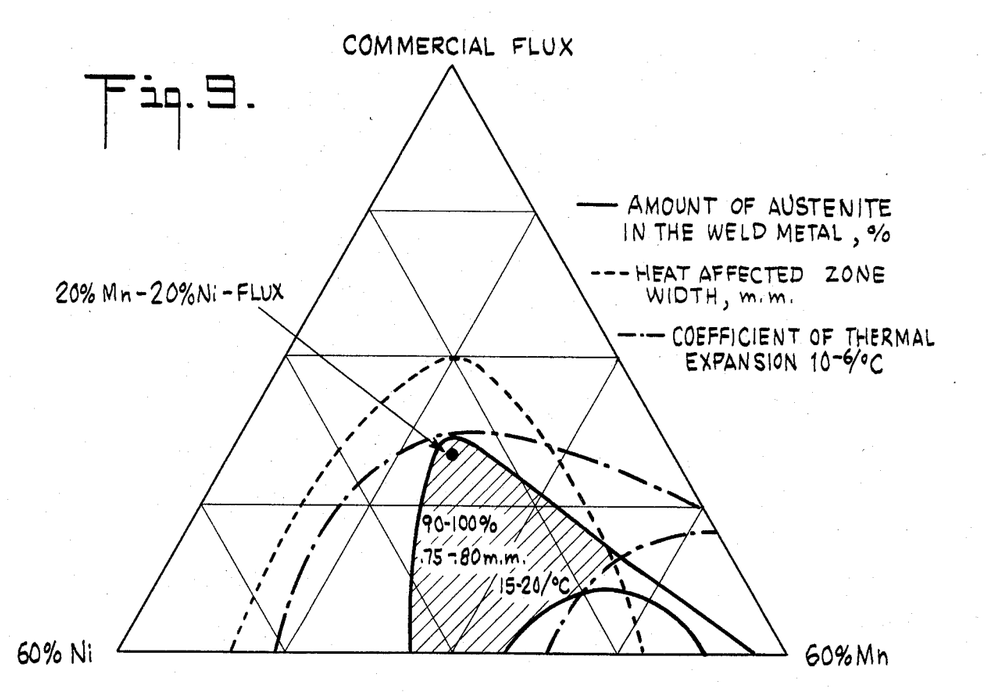
FIG. 9 illustrates the range of flux compositions which produce a desirable microstructure, width of the heat affected zone, and coefficient of thermal expansion in the welding of cast iron.

The discussion of fusion zone microstructure, heat affected zone width, and thermal expansion have shown that the least cracking and best machinability will be found in welds with at least 90% austenite, the narrowest heat affected zone (0.75-0.80 mm), and a thermal expansion coefficient of about $18.4 \times 10^{-6}$/°C. at 850° C. The ranges of flux compositions which produce each of these desirable properties are shown in FIG. 9.

The area common to these separate ranges in the range of filler compositions which produces the soundest welds. This is shown as the cross-hatched area of FIG. 9. Also shown in FIG. 9 is the point representing a 20% Mn-20% Ni composition. This composition would result in a weld metal which is about 90% austenite and only 10% carbides, has a heat affected zone of about 0.75 mm, and has a coefficient of thermal expansion of about $19.3 \times 10^{-6}$/°C. at 850° C. When economy is taken into account, the 20% Mn-20%Ni composition is optimal, though higher alloy compositions could be useful in some specific applications, for example, when dilution is very high.

The section on chemical analysis showed that the 20% Mn-20% Ni flux produces a fusion zone with 13.1% Mn and 15.9%Ni. The wire composition needed to produce an equivalent weld will vary according to the amount of dilution by the base metal; but for 30% dilution, which is typical of submerged arc and gas metal arc welding processes, the wire would have to contain 18.7% Mn and 22.7% Ni. For simplicity this wire composition of 60% Fe, 20% Ni and 20% Mn is called 20-20 casting filler metal. This is a substantial reduction of both Ni and total alloy content for the 55Ni rod commonly used at present, which contains at least 50% Ni.

While the invention has been described by referring to specific embodiments, it should be obvious to one of ordinary skill in the art that many variations can be made without departing from the scope of the present invention.

What is claimed is:

1. A welding composition for use in the submerged arc welded of cast iron, said composition consisting essentially of a mixture of nickel, manganese and flux delineated by the cross-hatched area of FIG. 9 in the drawings, said composition, when used with an iron welding wire producing a cast iron weldment having an improved coefficient of thermal expansion ranging from (15 to 20)×10$^{-6}$/°C. at 850° C. and a fusion zone wherein 1% to 10% of the weld metal matrix is discontinuous carbides.

2. A welding composition as claimed in claim 1 wherein the composition consists essentially of about 20% nickel, 20% manganese, and the balance a non-metallic flux.

3. A welding wire for use in the gas-metal arc welding of cast iron, said welding wire having a composition consisting essentially of a mixture of nickel and manganese delineated by the cross-hatched area of FIG. 9, with the balance iron, said wire and said process producing a cast iron weldment having an improved coefficient of thermal expansion ranging from (15 to 20)×10$^{-6}$/°C. at 850° C. and a fusion zone wherein 1% to 10% of the weld metal matrix is discontinuous carbides.

4. A welding wire as claimed in claim 3 wherein the wire consists essentially of about 20% nickel, about 20% manganese, and about 60% iron.

5. A welding wire as claimed in claim 3 wherein said wire is cut into individual rods.

6. A weldment for cast iron resistant to cracking along the fusion zone, said weldment comprising:
   (a) at least one base metal of cast iron, said cast iron base having a heat effected zone of 0.75-0.80 mm as defined by FIG. 9;
   (b) a weldment fusion zone consisting essentially of 13 to 20% manganese, 15% to 35% nickel, 1% to 3% carbon, with the balance iron and diluted base metal;
   (c) said fusion zone having a percentage of austenite and a co-efficient of expansion selected from the ranges delineated by the cross-hatched area of FIG. 9.

7. A weldment for cast iron as claimed in claim 6 in which said weldment consists essentially of about 13-14% manganese, 15-16% nickel and 1-2% carbon with the balance essentially iron.

8. A weldment as claimed in claim 6 wherein 90 to 100% of said weld metal matrix is austenite.

9. A weldment for cast iron resistant to cracking along the fusion zone, said weldment being formed by submerged arc welding or gas-metal arc welding wherein iron and a non-iron metallic mixture is added to a weld pool, said mixture consisting essentially of mixtures of nickel and manganese defined by the cross hatched area of FIG. 9, said weldment having an improved coefficient of thermal expansion of (15-20)×10$^{-6}$/°C. at 850° C., wherein 1% to 10% of the weld metal matrix is discontinuous carbides.

10. A weldment for cast iron as claimed in claim 9 wherein the metallic additions to said weld pool comprise about 20% manganese, about 20% nickel, and about 60% iron.

11. An improved method of welding cast iron which will avoid cracks along the fusion zone, said method comprising:
   (a) forming a weld pool on one or more pieces of cast iron to be welded;
   (b) protecting the weld pool from oxidation;
   (c) introducing into the weld pool a metallic misture consisting essentially of nickel, manganese and iron wherein the proportions by weight of nickel and manganese are defined by the cross-hatched portion of FIG. 9, the balance essentially iron;
   (d) cooling the weld pool to produce a fusion zone wherein 1% to 10% of the weld metal matrix is discontinuous carbides.

12. An improved method of welding cast iron as claimed in claim 11 wherein the mixture added consists essentially of about 20% manganese, about 20% nickel, and the balance essentially iron.

13. An improvement in the submerged arc method of welding cast iron, said method comprising:
   (a) covering one or more pieces of cast iron to be welded with a mixture consisting essentially of manganese, nickel and flux as defined by the cross-hatched area of FIG. 9;
   (b) introducing an iron rod into said mixture to contact said cast iron;
   (c) passing an electrical current between said iron rod and said cast iron to create a weld pool under said mixture, wherein iron and carbon from said cast iron, iron from said rod, and manganese and nickel from said mixture combine to form an improved weldment having a coefficient of thermal expansion of (15-20)×10$^{-6}$/°C. at 850° C. wherein 1% to 10% of the weld metal matrix is discontinuous carbides.

14. An improvement in the submerged arc welding of cast iron as claimed in claim 13 wherein said mixture consists essentially of about 20% manganese, about 20% nickel, and about 60% flux.

15. An improvement in gas metal arc welding of cast iron, said method comprising:
   (a) creating an electric arc between a welding wire and one or more pieces of cast iron to be welded, said arc forming a weld pool on said cast iron;
   (b) covering a portion of the welding wire and said weld pool with a non-oxidizing gas;
   (c) consuming said weld wire as the weld pool is advanced along said cast iron, said weld wire consisting of essentially a mixture of iron, manganese and nickel as delineated by the cross-hatched area of FIG. 9, the balance being essentially iron;
   (d) cooling said weld pool to form a weldment wherein 1% to 10% of the weld metal matrix is discontinuous carbides.

16. An improvement in gas metal arc welding as claimed in claim 15, wherein said weld wire comprises about 20% manganese, about 20% nickel, and about 60% iron.

* * * * *

UNITED STATES PATENT OFFICE
CERTIFICATE OF CORRECTION

Patent No. 4,534,793      Dated November 13, 1985

Inventor(s) David L. Olson, et al.

It is certified that error appears in the above-identified patent and that said Letters Patent are hereby corrected as shown below:

Column 1, line 29:   "and 35%" should be --to 35%--;

Column 4, line 7:   "case from" should be --came from--;

Column 8, line 12:   "used by" should be --caused by--;

Column 8, line 31:   "ranges in the" should be --ranges is the--;

<u>IN THE CLAIMS</u>:

Column 8, line 64:   "arc welded of" should be --arc welding of--.

Signed and Sealed this

Fourteenth Day of January 1986

[SEAL]

Attest:

DONALD J. QUIGG

Attesting Officer      Commissioner of Patents and Trademarks